May 1, 1956 — E. R. KEBBON — 2,743,613
BIMETALLIC THERMOMETER
Filed Nov. 13, 1952 — 2 Sheets-Sheet 1
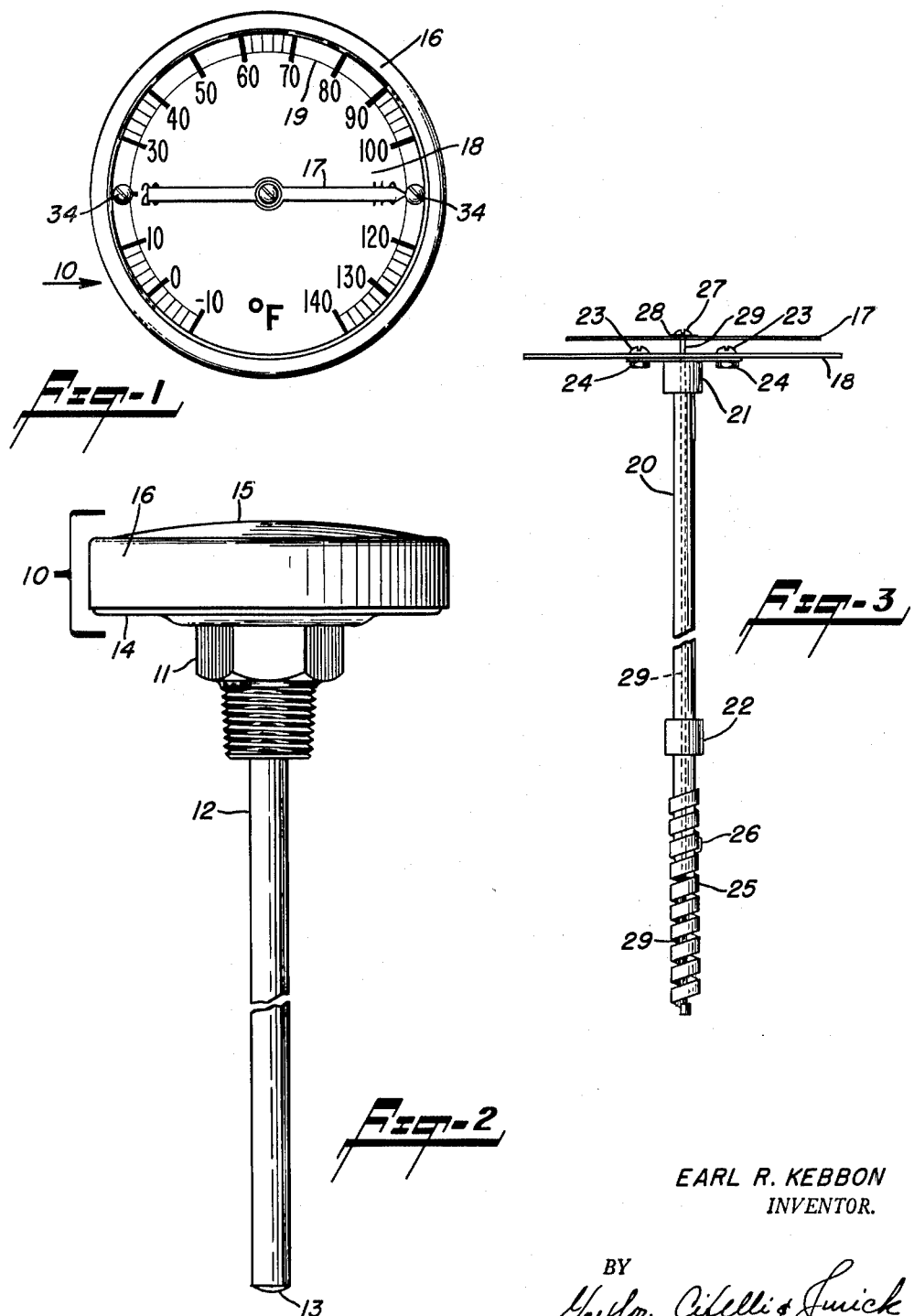
EARL R. KEBBON
INVENTOR.
BY
ATTORNEYS May 1, 1956  E. R. KEBBON  2,743,613
BIMETALLIC THERMOMETER
Filed Nov. 13, 1952  2 Sheets-Sheet 2
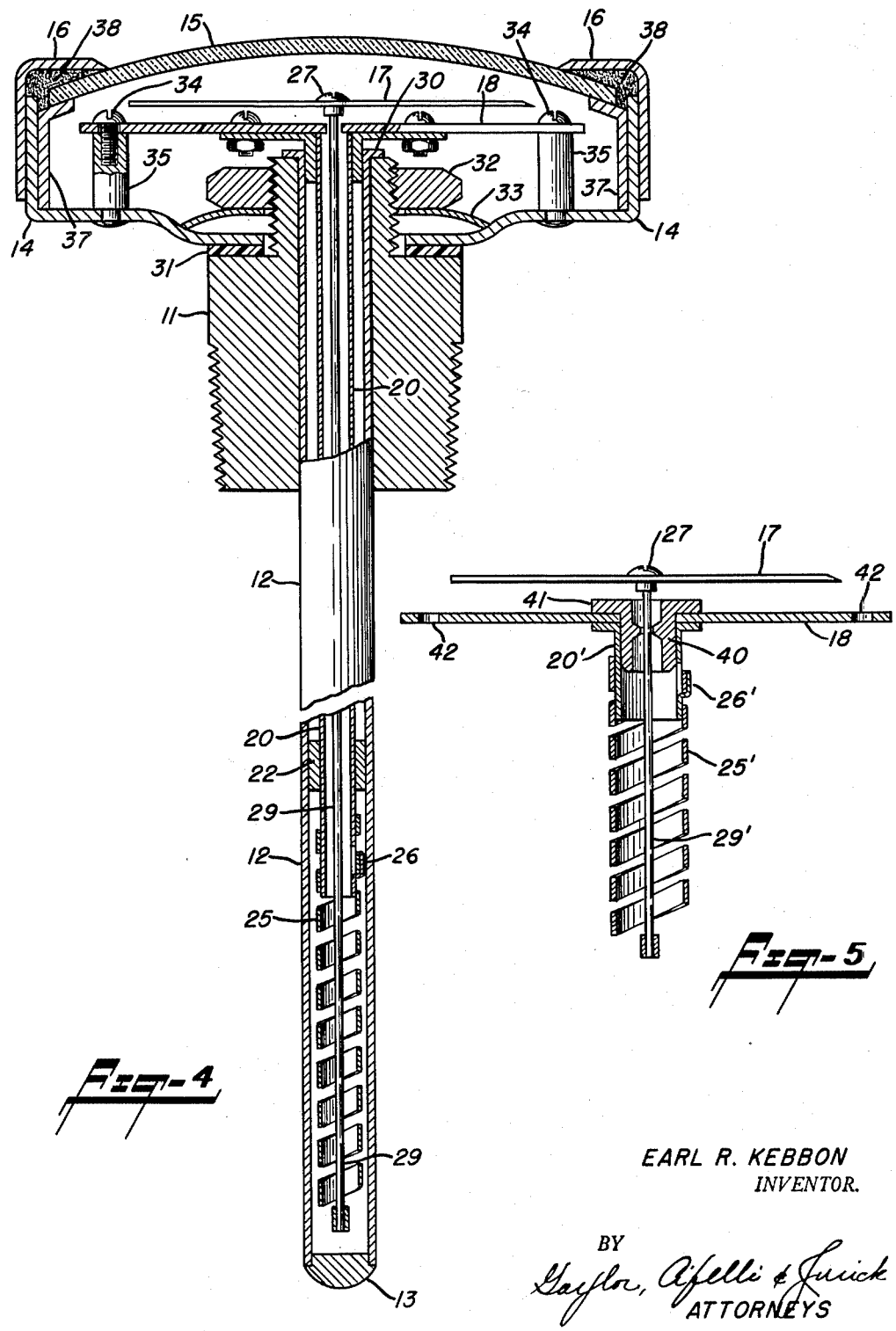
EARL R. KEBBON
INVENTOR.
BY
Gaylor, Afelli & Jurick
ATTORNEYS United States Patent Office 2,743,613
Patented May 1, 1956

2,743,613

BIMETALLIC THERMOMETER

Earl R. Kebbon, Chatham, N. J., assignor to Weston Electrical Instrument Corporation, Newark, N. J., a corporation of New Jersey Application November 13, 1952, Serial No. 320,256

2 Claims. (Cl. 73—367)

This invention relates to a bimetallic thermometer and more particularly to a novel construction and arrangement of the operating elements of such thermometer affording certain advantages in production and use.

Thermometers of the class to which this invention is directed include a bimetallic element in the form of a thin ribbon wound in the form of a helical coil of one or more layers. Such coil has one end secured to a staff that carries a pointer cooperating with a calibrated scale of temperature values. The scale must be calibrated in accordance with the temperature-deflection characteristics of the particular bimetallic coil so as to provide a high precision of indicating accuracy. In present constructions, one end of the bimetallic element is secured to a suitable plug which, in turn, is welded, or otherwise secured, to the protective shell surrounding the thermometer, and the scale plate (carrying the temperature graduations) is secured within the instrument head. Consequently, the steps of calibrating and checking of the instrument for accuracy of indications are made when the device is completely assembled. Any error found during such operations necessitates the complete dismantling of the device. Further, when such thermometers are provided with a mounting nut designed to be threaded into a suitable receptacle or socket, the thermometer head, in most instance, will not be disposed in the proper reading position when the mounting nut is fully threaded into the receptacle.

A thermometer constructed in accordance with this invention overcomes the above-stated disadvantages of present constructions. I form the bimetallic coil, staff, pointer and scale plate as an assembled unit apart from the normal instrument housing that comprises a case and shell. Such sub-assembly may be calibrated and checked as a unit and, if necessary, parts may be replaced conveniently or the relative position of the scale and pointer may be altered as required. The sub-assembly is then positioned within the protective shell and case and secured in fixed position relative to the case by fastening means provided between the scale plate and the case. The shell of the housing is secured to the mounting nut and such nut may be frictionally secured to the case such that one can be rotated relative to the other. Thus, when the mounting nut of the thermometer is threaded into a receptacle the entire instrument head, scale plate, pointer and bimetallic coil can be rotated as a unit in order to position the device as desired.

An object of this invention is the provision of a bimetallic thermometer in which the temperature-sensitive coil, the pointer and the scale plate constitute an operative subassembly apart from the normal protective shell and head thereby facilitating the calibration, checking and repair of the thermometer.

An object of this invention is the provision of a bimetallic thermometer wherein the protective shell is secured to a mounting nut and such nut is frictionally secured to the thermometer head whereby the head may be rotated with respect to the nut when the latter is held in fixed position.

An object of this invention is the provision of a bimetallic thermometer comprising a protective shell secured to and extending from a threaded mounting nut, a head in the form of a cup-like case frictionally secured to the mounting nut, a scale plate carrying temperature graduations and removably secured to said case, a tubular member adjustably secured to the scale plate and disposed within said shell, a bimetallic coil having one end secured to the tubular member and the other end secured to a staff that passes upwardly through the tubular member and through a hole provided in the scale plate, and a pointed affixed to the free end of said staff and cooperating with the temperature graduations carried by the scale plate.

These and other objects and advantages will become apparent from the following description when taken with the accompanying drawings. It will be understood the drawings are for purposes of illustration and are not to be construed as defining the scope or limits of the invention, the novel features of the invention being pointed out in the appended claims.

In the drawings wherein like reference characters denote like parts in the several views:

Figure 1 is a front view of a bimetallic thermometer made in accordance with this invention;

Figure 2 is a side view of such device;

Figure 3 is a side view of the sub-assembly unit comprising the tubular member, the bimetallic coil, staff, pointer and scale plate;

Figure 4 is a central, cross-sectional view of the complete instrument and drawn to an enlarged scale; and Figure 5 is a central sectional view showing a modification of the sub-assembly unit.

As shown in Figures 1 and 2, the thermometer comprises a head 10 attached to a threaded mounting nut 11 through which extends the protective shell 12, the lower end of the shell being closed by a plug 13 that may be soldered or welded to the shell. The head is made up of cup-like case 14 having its end closed by a transparent cover 15 held in place by the clamping ring 16. A pointer 17 is rotatable relative to a scale plate 18 that carries a set of temperature graduations 19.

Reference is now made to Figure 3 which is a side view showing my sub-assembly of the operative parts constituting the indicating portion of the thermometer. A tubular member 20 has one end secured to a flange 21 as by solder. The base of the flange is secured to the scale plate 18 by means of the screws 23 and nuts 24. It may here be pointed out that the flange 21 may be provided with arcuate holes, or slots, formed on a radius with respect to the axis of the tubular member 20 whereby the scale plate 18 may be rotated, in one direction or the other, relative to the flange 21 when the nuts 24 are not tightly threaded on the screws 23. Alternatively, the arcuate holes may be provided in the scale plate 18 and the screws may be threaded into alined, threaded holes provided in the base of the flange, thereby eliminating the cooperating nuts 24. The temperature-sensitive, bimetallic element 25 is wound in the form of a helical coil. The lower end of the coil is brazed, or welded, to the lower end of a staff 29 and the other coil end is secured, similarly, to a tab or lug 26 that is spaced or offset outwardly from, but an integral part of, the tubular member 20 and disposed intermediate the ends thereof. Such lug is formed by a punching and forming operation so that the ribbon of the bimetallic coil fits snugly between the lug and the body of the tubular member. It will be noted that the diameter of the helical coil 25 corresponds substantially to that of the tubular member from which it will be apparent that the coil may be threaded to more or less extend on the tubular member with the lug 26 serving as a guide member. Thus, the active length of the bimetallic coil can be adjusted to provide a desired deflection characteristic thereby making it possible to use pre-printed scales. When, by actual test, the proper coil length is established, the lug 26 is spot welded to the coil thereby permanently fixing the deflection characteristics of the thermometer.

The staff 29 passes upwardly through the helical coil and through a hole in the scale plate 18 and the pointer 17 is secured to the upper end of the staff, as shown. Those skilled in this art will understand that a temperature change at the bimetallic coil produces a corresponding rotation of the staff 29 and the actual temperature reading is obtained by noting the position of the pointer relative to the calibrated scale 19 (see Figure 1) carried by the scale plate 18. It will be noted that the assembly illustrated in Figure 3 is a complete, operative unit and can be calibrated as such by placing the bimetallic coil into suitable temperature baths. Since all parts are readily accessible, any of the component parts are readily adjustable or replaceable. Also, since the scale-plate is adjustable with respect to the tubular member 20, which serves as an anchor for the fixed end of the helical coil, the pointer can be set in proper relationship with respect to a selected mark on the calibrated scale after which the scale plate and the member 20 are secured against relative displacement by tightening the nuts 24.

The desirable feature affording a selective setting of the pointer into alinement with a given scale mark can also be realized by frictionally securing the pointer to the staff end as by means of the screw 27 and washer 28.

A bushing 22 is secured to the tubular member 20, said bushing having an outer diameter corresponding to that of the shank of the flange 21. These members, therefore, serve as guide means when the assembled unit is inserted into a protective shell as will now be described.

Reference is now made to the cross-sectional view of Figure 4. As explained hereinabove, the protective, outer shell 12, of the thermometer, is secured to the threaded mounting nut 11, the shell passing through a central hole in the nut and having its outwardly flared, upper end 30 soldered to the top surface of the nut. It will be noted that the mounting nut 11 has a reduced-diameter section forming a shoulder for the accommodation of the resilient washer 31. The bottom of the cup-like case 14 rests upon this washer and the case and the mounting nut 11 are frictionally secured together by the nut 32 and the spring washer 33. As is apparent, the amount of force required to produce relative rotation between the case 14 and the mounting nut 11 is determined by the amount of compression applied to the spring washer 33 by the nut 32. In actual practice I pre-adjust such frictional force so that the case may be rotated with respect to the mounting nut by hand, after which the nut 32 is staked, or otherwise secured, to the mounting nut.

The sub-assembly, shown in Figure 3, is now inserted as a unit into the thermometer housing, with the tubular member 20 disposed within the protective shell 12, the latter having a length such that the lower end of the staff 29 is spaced from the plug 13 closing the lower end of the shell 12. The scale plate 18 is then secured to the case 14 by means of the screws 34 threaded into holes in the supporting posts 35 which may be spot welded to the case 14, or riveted thereto as shown in the drawing. Thus, the entire operative unit of the thermometer is secured in fixed position relative to the case. In accordance with general practice, an annular spacer member 37 occupies the space between the cover glass 15 and the case 14 so that all parts are firmly held in position by the clamping ring 16 that is internally cemented into place by a plastic or cement 38.

When the thermometer is inserted through a vertical wall of a vessel, or receptacle, the mounting nut 11 is threaded into a threaded hole, provided in such wall, by means of a wrench applied to the flat, outer surfaces of the mounting nut. In the case of conventional thermometers, it often happens that when the mounting nut is fully threaded into the hole the scale of the thermometer is unbalanced, positionally, with respect to vertical and, in fact, may even be upside down. To correct for such undesirable scale orientation it has been the practice to provide a swivel connection or a union, each of which increases the cost of the device. My thermometer construction obviates the need of such special connection members as the user can rotate the entire thermometer head by hand and rotation of the head results in a corresponding rotation of the scale plate 18, pointer 17, tube 20 and the bimetallic coil 25, thereby preserving the original relative positions of these parts and the indicating accuracy of the instrument.

A modification of the sub-assembly unit is shown in Figure 5. Here, the upper end of the tubular member 20' is flared outwardly and abuts the lower surface of the scale plate 18. The scale plate is secured to the tubular member by a flange-like bushing having its shank portion 40 force-fitted into the tubular member 20' and its base section 41 overlying the scale plate. Thus, the scale plate is frictionally secured to the tubular member whereby these members may be rotated relative to each other in order to bring the pointer 17 into exact alinement with a given scale mark. After the pointer and scale are properly alined further relative displacement can be prevented by applying a suitable cement between the scale plate surface and the flared end of the tubular member 20' and/or the base 41 of the flange-like bushing. The ends of the bimetallic coil 25' are secured to the staff 29' and to the lug 26', as has been explained with reference to Figure 3. It will be apparent that the sub-assembly unit shown in Figure 5 can be inserted into a thermometer housing and secured in fixed position relative to the housing by screws passing through the scale plate holes 42 and into supporting posts, as has been described with reference to Figure 4. It may here be stated that the construction shown in Figure 5 lends itself to the provision of the thermometer having a very short stem length.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A bimetallic thermometer comprising a cup-shaped case having a central opening in the base, a transparent cover closing the case, a mounting nut having a first portion exterior of the case, a threaded second portion passing through said opening into said case, a second nut within said case threaded on said second portion, said second nut and said first portion being greater in diameter than said opening and said second portion being smaller in diameter than said opening, a spring washer on said second portion held by said second nut in yielding frictional contact with the interior surface of the case base, a protective shell passing through an axial hole in the mounting nut and secured to said mounting nut, posts having ends secured to the case base and extending toward the cover, a scale plate carrying temperature markings and removably secured to said posts, a tubular member having one end adjustably secured to the scale plate and the other end extending into said shell, a portion of the wall of said tubular member having intermediate its ends an outwardly spaced lug, a bimetallic coil having one end portion secured to the lug and extending under it and outwardly of the body of the tubular member, a staff having one end secured to the other end of the coil, said staff extending through the coil and through a central hole in the scale plate, and a pointer secured to the staff and cooperating with the temperature markings carried by the scale plate.

2. The invention as recited in claim 1, wherein the bimetallic coil is helical having an inside diameter slightly less than the outside diameter of the tubular member, the said one end of the coil being disposed between the lug and the outer wall of the tubular member with the proximate coil convolution encircling the tubular member.

References Cited in the file of this patent

UNITED STATES PATENTS

| | | |
|---|---|---|
| 1,222,315 | Manning | Apr. 10, 1917 |
| 1,429,975 | Roth et al. | Sept. 26, 1922 |
| 1,696,393 | Fageros | Dec. 25, 1928 |
| 1,787,327 | Schlaich | Dec. 30, 1930 |
| 1,930,062 | Rutenber | Oct. 10, 1933 |
| 2,601,784 | Rose | July 1, 1952 |

FOREIGN PATENTS

| | | |
|---|---|---|
| 893,842 | France | Feb. 28, 1944 |
| 561,287 | Great Britain | May 12, 1944 |
| 577,303 | Great Britain | May 13, 1946 |